Patented Dec. 1, 1931

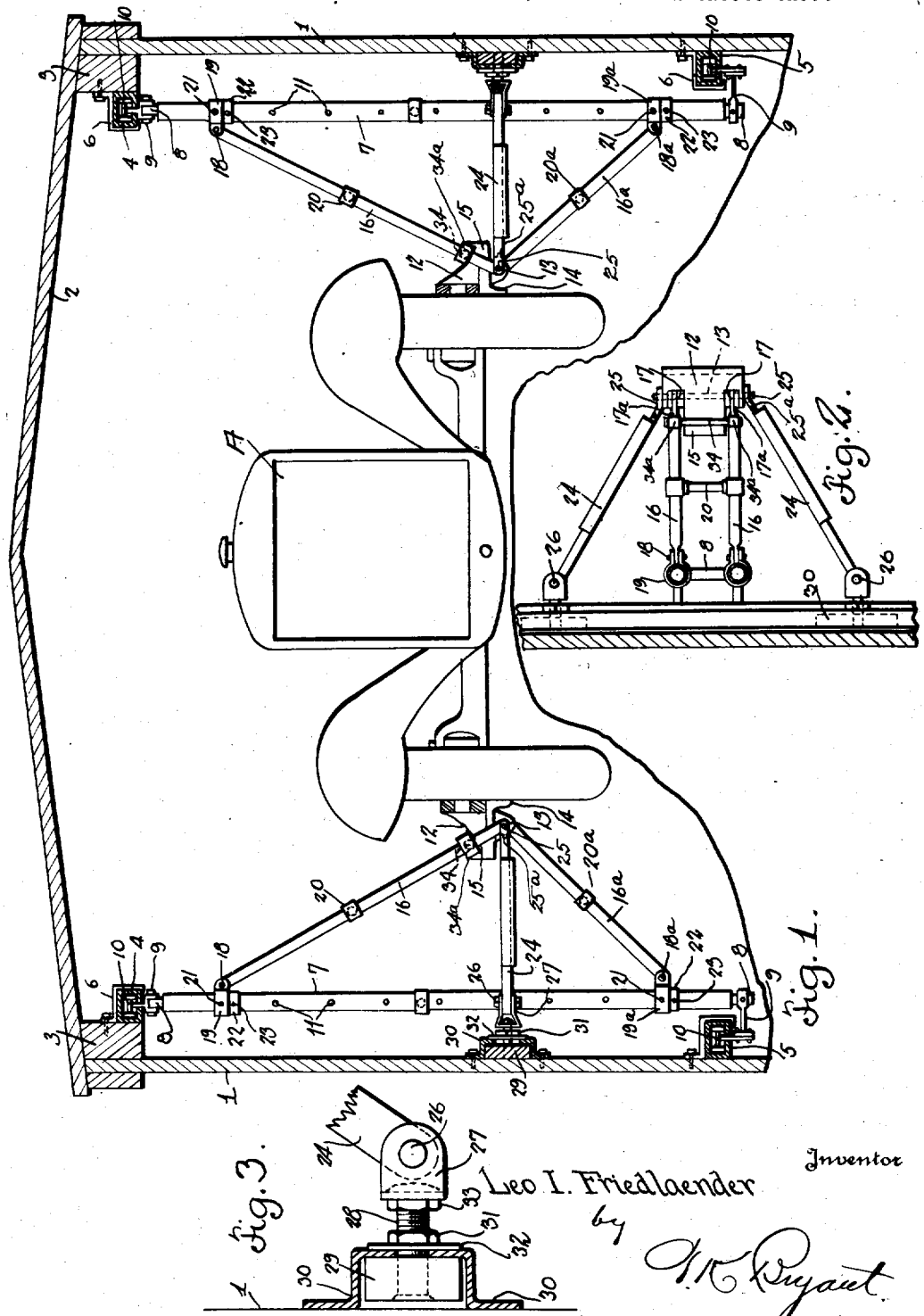

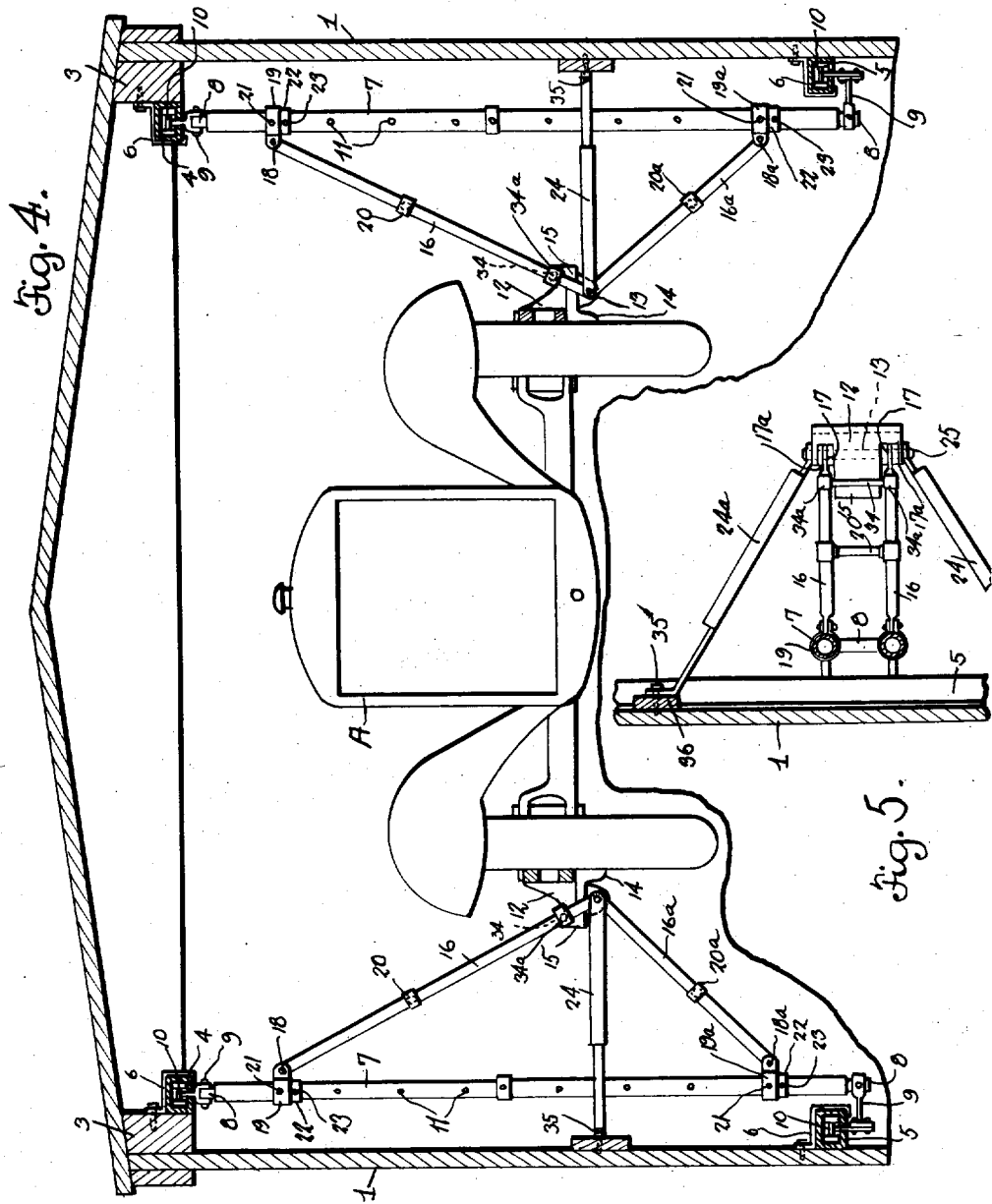

1,834,834

UNITED STATES PATENT OFFICE

LEO I. FRIEDLAENDER, OF DETROIT, MICHIGAN, ASSIGNOR TO EVANS PRODUCTS COMPANY, OF DETROIT, MICHIGAN, A CORPORATION OF DELAWARE

AUTOMOBILE DECKING DEVICE

Application filed June 30, 1931. Serial No. 547,997.

This invention relates to certain new and useful improvements in automobile decking devices.

The primary object of the invention is to provide automobile decking devices for use in the shipment of automobiles wherein perpendicular supporting members adjustable in a horizontal plane carry hanger and brace members adjustable relative thereto and carrying means for the support of an automobile.

A further object of the invention is to provide an automobile decking device of the foregoing character wherein horizontally disposed brace arms are provided to prevent longitudinally shifting movement of the decking structure with novel swivel and anchor devices associated with the horizontally disposed brace arms.

A still further object of the invention is to provide a decking structure for the shipping of automobiles wherein a pivotally mounted wheel hub support is carried by the decking structure with means to prevent tilting of the hub support during the mounting of an automobile thereon.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary cross-sectional view of a shipping car for automobiles showing the decking structure in operative position with an automobile supported thereon;

Figure 2 is a top plan view of the decking structure with a part of the shipping car shown in section;

Figure 3 is a detail sectional view showing the swivel and anchor support for the outer end of one of the brace arms;

Figure 4 is a fragmentary cross-sectional view, similar to Figure 1, showing another form of anchor for the outer ends of the horizontal brace arms; and Figure 5 is a fragmentary top plan view, similar to Figure 2, of the decking structure with a part of the shipping car shown in section.

The decking structure is especially designed for association with an automobile shipping or freight car, the latter being illustrated as comprising side walls 1, a roof 2, and head corner rails 3, but it is to be understood that any preferred construction of shipping conveyance may be employed. A pair of longitudinally extending channel tracks 4 and 5 are respectively arranged adjacent the upper and intermediate portions of the side walls 1 of the car and are supported in position by the bracket hangers 6. A pair of spaced parallel perpendicularly arranged posts 7 are disposed adjacent each side wall 1, being connected at their upper and lower ends by spacing arms 8 and each arm 8 carries a hanger 9 for the support of a track roller 10 movable through the channel tracks 4 and 5. The posts 7 are provided with transverse openings 11 for purposes presently to appear.

To support the automobile A in a decked position as illustrated in Figure 1, there is provided a wheel hub supporting block 12 fashioned for the support of a wheel hub and having a cross pin 13 journalled therethrough, the forward side of the hub supporting block 12 carrying a downwardly directed flange 14 while the rear side thereof carries an upwardly directed flange 15.

The support for the hub block 12 includes a pair of arms 16 having the ends 17 pivotally supported on the pin 13 of the hub supporting block 12 while their other ends are pivotally connected as at 18 to strap collars 19 surrounding an adjacent post 7, the intermediate portions of the arms 16 being braced by the cross arm 20 as shown in Figure 2. A similar pair of lower arms 16a are pivotally connected as at 17a to the pin 13, being braced intermediate their ends by the cross arm 20a while the lower ends thereof are pivotally connected as at 18a to the collar 19a slidable upon an associated post 7. The collars 19 and 19a are adjustable upon the posts 7 to properly position the wheel hub supporting blocks 12 the desired distance from the side wall 1 of the car for the support of the automobile A, the collars 19 and 19a being retained in adjusted positions by the stub screws 21 and said collars 19 and 19a are further braced and supported by separate collars 22 slidable upon the posts 7 and retained in supporting position by pins 23 passed through the collars 22 and receivable in a registering transverse opening 11.

To prevent longitudinal shifting movement of the posts 7 in the channel tracks 4 and 5 when the automobile is supported in the decking structure, there is provided a pair of horizontally disposed arms 24, one at each side of the wheel hub supporting block 12 and pivotally attached thereto as at 25, with a hinge connection 25a adjacent the pivot mounting 25 to constitute a substantial universal connection, the outer ends of the arms 24 having a swivel connection with an anchor block adjustable in a longitudinal channel carried by the side wall 1 of the car. As shown in Figure 3, the outer end of the horizontal brace arm 24 is pivotally connected as at 26 to the head 27 that is swivelly mounted upon the headed end of the screw bolt 28, the screw bolt extending into an anchor block 29 that is slidably mounted in the longitudinally extending channel member 30 carried by the side wall 1 of the freight car. If desired, the arms 24 may be extensible as indicated by dotted lines in Fig. 1 and full lines in Fig. 2. To anchor the decking structure in position, the nut 31 threaded upon the screw bolt 28 between the swivelled head 27 and channel member 30 is moved into binding engagement with the channel member, with a bearing washer 32 interposed therebetween and to restrain the swivelled head from movement, the nut 33 upon the screw bolt 28 is moved into engagement with the swivel head for anchoring the latter to the head of the screw bolt 28, this construction and operation being clearly obvious from an inspection of Figure 3.

When it is desired to mount the automobile A in the decked position illustrated in Figure 1, it being understood that the arms 16 and 16a normally occupy positions substantially parallel with the posts 7, the automobile is elevated into position and the arms 16 and 16a with the wheel hub supporting block 12 swung outwardly toward the automobile and to maintain the block 12 in perpendicular supporting position and against tilting movement, cross pins 34 carried by the arms 16 are positioned inwardly of the block flange 15 as illustrated in Figure 1. As shown in Figures 1 and 3, the pin 34, is carried by a pair of collars 34a slidable on the arms 16, the pin being movable into position to engage the block flange 15. The blocks 12 are then engaged with the hubs of the automobile A and the collars 19 and 22 are locked to the posts 7, while the outer ends of the horizontal brace arms 24 are anchored to the channel member 30 in a manner as previously described and when so disposed, the cross pins 34 associated with the wheel hub supporting blocks 12 may be removed if desired as the automobile will retain the blocks in position. The decking structure is adjustable longitudinally of the car while the elevation of the wheel hub supporting block 12 is controlled by movement of the arms 16 and 16a upon the posts 7 and the swivelled head 27 at the outer ends of the anchor and brace arms 24 permit proper positioning of of the arms 24.

In the form of invention shown in Figures 4 and 5, the main features of the invention as shown in Figures 1 and 2 are substantially duplicated with the exception that the outer ends of the substantially horizontally disposed brace arms 24a are anchored by nails, spikes or the like as at 35 and blocks 36 to the walls 1 of the car, this form of the invention eliminating the provision of the intermediately positioned longitudinally extending channel member 30.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In a decking structure, pairs of longitudinally shiftable supporting posts, a wheel hub supporting block, an arm projecting from each post adjacent the upper and lower ends and adjustable on the posts, and a pivot pin connection between the outer ends of the arms and the hub supporting block.

2. In a decking structure, pairs of longitudinally shiftable supporting posts, a wheel hub supporting block, an arm projecting from each post adjacent the upper and lower ends and adjustable on the posts, and a pivot pin connection between the outer ends of the arms and the hub supporting block, said block being overbalanced, and means to prevent tilting of the block.

3. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, said block being overbalanced, and a pin interlockingly connecting the block and upper arms to prevent tilting of the block.

4. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, and means to restrain the posts from longitudinal shifting movements.

5. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, said block being overbalanced, means to prevent tilting of the block, and means to restrain the posts from longitudinal shifting movements.

6. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, and means to restrain the posts from longitudinal shifting movements, including an arm pivotally connected to each side of the block with the outer ends anchored to a stationary support.

7. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, said block being overbalanced, means to prevent tilting of the block, and means to restrain the posts from longitudinal shifting movements, including an arm pivotally connected to each side of the block with the outer ends anchored to a stationary support.

8. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, and means to restrain the posts from longitudinal shifting movement, including an arm pivotally connected to each side of the block, with a longitudinally extending channel member, a block swivelly attached to the outer end of each arm and slidable in the channel member, and anchor means for the last named block.

9. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, said block being overbalanced, means to prevent tilting of the block, means to restrain the posts from longitudinally shifting movements, including an arm pivotally connected to each side of the block with a longitudinally extending channel member, a block swivelly attached to the outer end of each arm and slidable in the channel member, and anchor means for the last named block.

10. Automobile decking comprising a shiftable support, arms projecting from the support, and a tiltable wheel hub supporting block pivotally supported on the arms.

11. Automobile decking comprising a shiftable support, arms projecting from the support, a tiltable wheel hub supporting block pivotally supported on the arms, and means associated with the arms and block to hold the block against tilting movement and in position to receive a wheel hub.

12. Automobile decking comprising a shiftable support, arms projecting from the support, a tiltable wheel hub supporting block pivotally supported on the arms, and arms pivotally attached at corresponding ends to the block and adjustably anchored at their other ends for holding the support against movement.

13. Automobile decking comprising a shiftable support, arms projecting from the support, a tiltable wheel hub supporting block pivotally supported on the arms, means associated with the arms and block to hold the block against tilting movement and in position to receive a wheel hub, and arms pivotally attached at corresponding ends to the block and adjustably anchored at their other ends for holding the support against movement.

14. In automobile decking, the combination with a freight car, of vertical supports shiftable longitudinally of the car, arms adjustable at corresponding ends on the supports, a wheel hub supporting block tiltably supported at the other ends of the arms and means for holding the block against tilting movement and in position to receive a wheel hub.

15. In automobile decking, the combination with a freight car, of vertical supports shiftable longitudinally of the car, arms adjustable at corresponding ends of the supports, a wheel hub supporting block tiltably supported at the other ends of the arms and means for holding the block against tilting movement and in position to receive a wheel hub, a channel member extending longitudinally of the side wall of the car, a block having a swivelled head adjustably anchored in the channel member, and arms pivotally connected to the block and swivelled head to hold the supports against movement.

16. In a decking structure, pairs of longitudinally shiftable supporting posts, a wheel hub supporting block, an arm projecting from each post adjacent the upper and lower ends and adjustable on the posts, and a pivot pin connection between the outer ends of the arms and the hub supporting block, said block being overbalanced, and means to prevent tilting of the block, including a pin slidable on the upper arms and engageable with the block.

17. In a decking structure, pairs of longitudinally shiftable supporting posts, a wheel hub supporting block, an arm projecting from each post adjacent the upper and lower ends and adjustable on the posts, a pivot pin connection between the outer ends of the arms and the hub supporting block, said block being overbalanced, means to prevent tilting of the block, including collars slidable on the upper arms and a pin extending between the collars adapted to be engaged with the block.

In testimony whereof I affix my signature.
LEO I. FRIEDLAENDER.